United States Patent [19]

Mintz et al.

[11] Patent Number: 5,373,553
[45] Date of Patent: Dec. 13, 1994

[54] AUTOMATIC GENERATION OF CONTROL MESSAGES FOR A COMMUNICATION NETWORK BASED ON INPUT OF PARAMETERS TO BE MODIFIED

[75] Inventors: Donald J. Mintz, Fair Haven, N.J.; Robert F. Schillo, Granville, Ohio; V. Seshadri, Lincroft, N.J.

[73] Assignee: AT&T Corp., Murray Hill, N.J.

[21] Appl. No.: 145,909

[22] Filed: Oct. 29, 1993

[51] Int. Cl.$^5$ .............................. H04M 7/00
[52] U.S. Cl. ............................ 379/220; 379/221; 379/268
[58] Field of Search ............ 379/220, 219, 221, 268

[56] References Cited

U.S. PATENT DOCUMENTS 4,924,510  5/1990  Le .......................... 379/222
5,014,262  5/1991  Harshavardhana ........... 379/221

*Primary Examiner*—James L. Dwyer
*Assistant Examiner*—Michael N. Lau
*Attorney, Agent, or Firm*—Charles L. Warren

[57] ABSTRACT

A group of rules is stored in memory of a computer system wherein each rule defines an allowable combination of configurable parameters that are controllable by command message. Inputs are received from the user indicating the specific ones of the configurable parameters to be controlled. The selected parameters are compared to the rules to determine sets of configurable parameter communications which are allowed; a first list of such parameters is generated. One of the sets of parameters from the first list is entered on a second list. The first list is modified to exclude sets of configurable parameters which include a control parameter included in the set entered on the second list. This process is repeated until all selected parameters by the user are contained on the second list. The second list of parameters each have a corresponding command message and thus, a group of command messages are automatically generated to control the selected parameters.

14 Claims, 4 Drawing Sheets

AUTOMATIC GENERATION OF CONTROL MESSAGES FOR A COMMUNICATION NETWORK BASED ON INPUT OF PARAMETERS TO BE MODIFIED

BACKGROUND OF THE INVENTION

This invention relates to the control of telecommunication networks and more specifically, addresses the complexity of creating command messages to be sent to nodes in the network.

Telecommunications systems typically comprise a plurality of nodes which route information traveling within the network. Typically, each node is connected to at least two other nodes by communication circuits. Each communication circuit consists of a plurality of transmission groups, each of which in turn consists of a plurality of communication channels. The transmission groups may utilize a multiconductor cable, an optical cable, or other type of transmission facility. Long distance telephone networks are examples of such telecommunication systems.

Such networks utilize intelligent nodes which respond to command messages to change routing parameters and to enable/disable communication between nodes. While this capability provides a network administrator with substantial flexibility in controlling the network, it also places a burden on such administrators to construct accurate and precise command messages that effectuate the desired response. Transmitting an improperly constructed command message may cause substantial disruption in the network. Thus, network administrators are often reticent to implement changes in the network for fear that an improper command message will cause an undesired occurrence. This situation is further exacerbated by complex command message formats which must be followed.

It is common for network administrators to either write out or diagram command messages in an effort to minimize inadvertent errors. Even though such steps are taken, the format complexities which are involved in some systems still make the process of sending properly constructed command messages difficult. Thus, there exists a need for means for reducing the burdens placed on network administrators in formulating command messages.

SUMMARY OF THE INVENTION

It is an object of the present invention to minimize the burdens of constructing proper command messages by providing the automatic construction of command messages based on simplified user inputs.

In accordance with an embodiment of the present invention, a telecommunication network includes communication nodes interconnected with other nodes by a plurality of communication channels. A computer implemented method is utilized to select command messages which control corresponding communication channels. A group of rules relating to command message formats is stored in memory wherein each rule defines an allowable combination of communication channels that are controllable by a single command message. User inputs, such as made by a pointing device using a graphical user interface computer system, are received and stored. These inputs define the communication channels to be controlled. After the user has defined all the desired channels to be controlled, a comparison is made between the user selected communication channels and the stored rules to determine sets of communication channels which are allowable, i.e. permitted under the format rules to be grouped together. Each of the allowed sets of communication channels are stored on a first list. A second list is begun by choosing one of the sets on the first list. The first list is then modified to exclude sets of communication channels which require a communication channel that was included in the set stored on the second list. This selection process of sets on the first list which are selected to be entered on the second list continues until all of the communication channels selected by the user are contained in a set on the second list. Each of the sets contained in the second list have a corresponding command message. Thus, a group of command messages associated with the sets of the second list are automatically determined and can be transmitted to the node associated with the communication channels. This collection process eliminates at least one type of user error by automatically grouping and collecting allowable sets of communication channels which can be controlled by a validated group of command messages. It will be apparent to those skilled in the art that command messages which control other parameters associated with communication nodes or with traffic handled by the nodes can be generated by this method.

DETAILED DESCRIPTION

Figure 1:
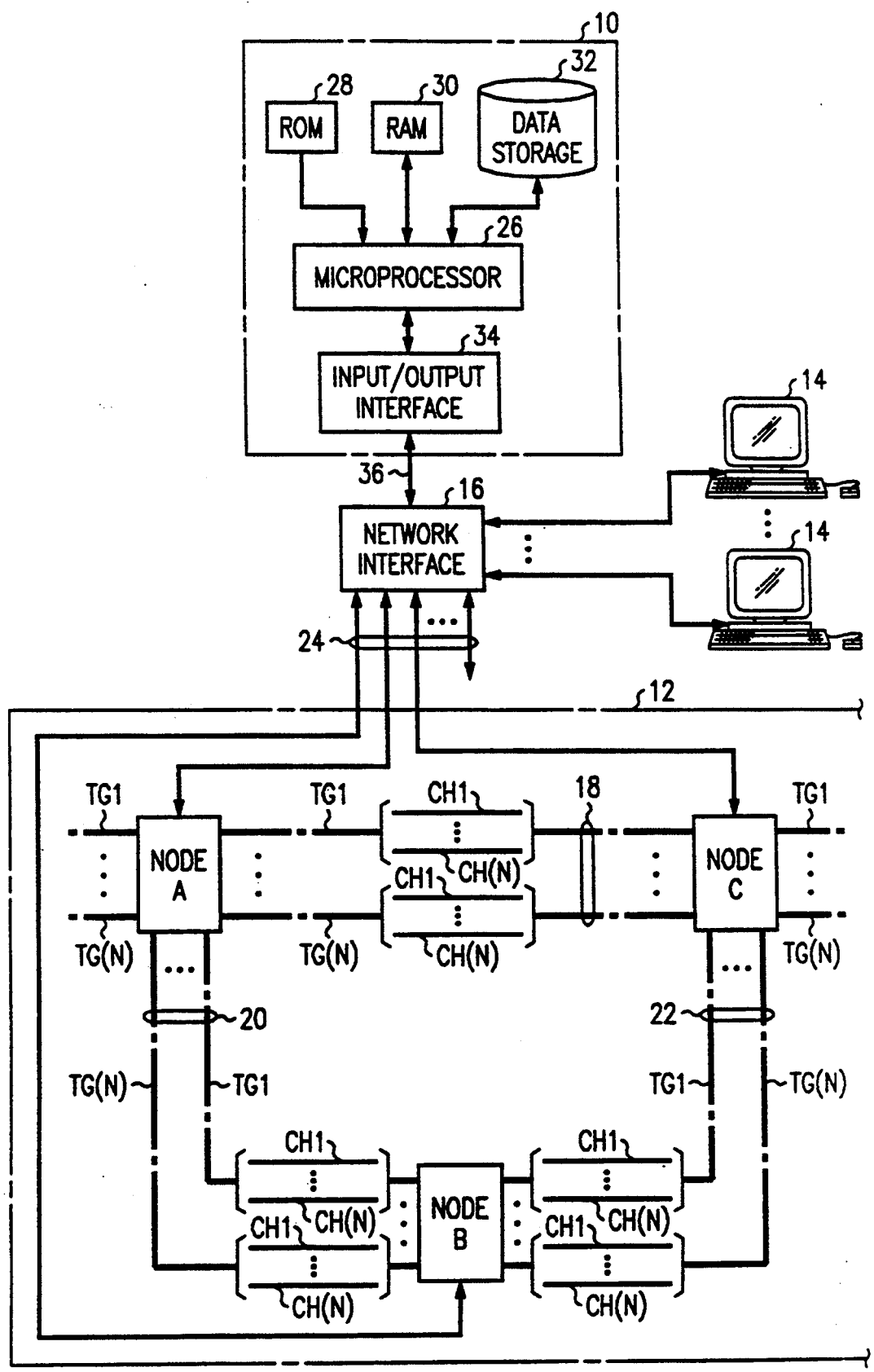
FIG. 1 is a block diagram of a telecommunication network in accordance with the present invention.

FIG. 1 illustrates a telecommunication or communication network which includes a computer system 10 which operates in accordance with the present invention to assist a traffic administrator in sending command messages to the traffic carrying network 12. Since the embodiment of the present invention is directed to the administration and sending of command messages, reference to "user(s)" refers to personnel responsible for controlling and administering the network, such as a traffic administrator. Terminals 14 are coupled by network interface 16 to the computer system 10. The terminals include data entry devices such as a keyboard and pointing device such as a mouse allowing users to send inputs to computer system 10. The terminals also include a screen which receives a visual display generated by the computer system. The terminals may comprise a personal computer.

The network 12 illustrates a portion of a communication system such as a telecommunication system consisting of a plurality of nodes linked together by communication circuits in order to transport information through the network. The illustrated portion of the network contains node A, node B, and node C. These nodes are coupled together by transmission circuits 18, 20, and 22 which couple node pairs A-C, A-B, and B-C, respectively. Each transmission path includes a plurality of transmission groups TG1-TG(N). Each transmission group in turn contains a plurality of communication channels CH1-CH(N). The nodes comprise electronic switches which include configurable parameters and include the ability to control the routing of traffic over the connected transmission groups and channels. For example, the network 12 may comprise a long distance telephone communication network in which the nodes comprise AT&T 4ESS TM switches. In the illustrative embodiment, nodes A and C are also connected to other nodes (not shown) in the network.

The network interface 16 includes a plurality of transmission channels 24 which are connected respectively to the nodes in network 12. These channels provide a transmission facility for carrying command messages to the nodes and receiving from the nodes information concerning the status and operating parameters of the nodes. The network interface 16 may, for example, comprise an AT&T Network Management Operations System (NEMOS) which provides real-time network management for traffic administrators. Network interface 16 accepts command messages in a predefined format for transmission to the addressed node in network 12. However, the network interface merely functions to relay such constructed command messages which are input to the network for transmission.

Computer system 10 includes a microprocessor 26 which is supported by read-only memory (ROM) 28, random access memory (RAM) 30 and a data storage device 32 such as a hard disk drive. An input/output interface 34 facilitates communication between the microprocessor 26 and external devices over communication channel 36. Users send inputs by terminal 14 and network interface 16 to the computer system using channel 36. The computer system communicates via the network interface 16 with the users by sending information to be displayed on the screens of the terminals 14 and communicates with network interface 16 itself by sending command messages on behalf of the users. The network interface 16 accepts the command messages and transmits the command messages to the destination nodes over channels 24.

Figures 2, 3:
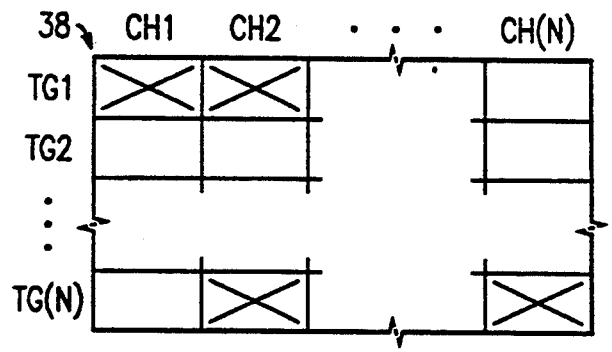
FIG. 2 illustrates a control matrix which allows a user to identify communication channels to be modified by command messages.
FIG. 3 illustrates a visual representation of a database that contains rules which define communication channel grouping patterns permitted to be implemented by a single command message.
Figure 4:
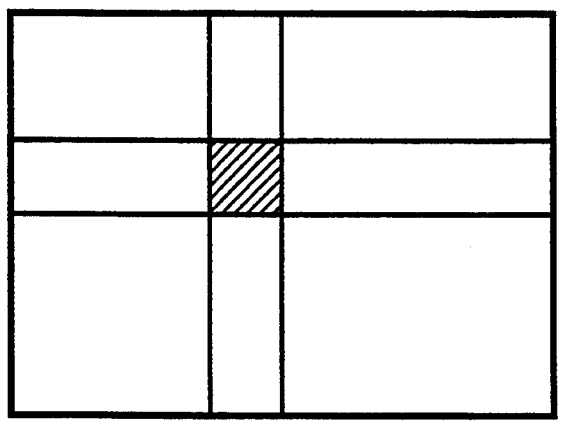
FIGS. 4, 5, and 6 provide a visual representation of the valid matrix patterns associated with rules 1, 2 and 3 of FIG. 3, respectively.

FIG. 2 illustrates a control matrix 38 which, in the illustrative example, includes a plurality of rows representing each of the transmission groups TG1-TG(N) and columns representing each of the channels CH1-CH(N) associated with each of the transmission groups. Thus, this matrix defines a corresponding cell identifying each communication channel between a pair of nodes, such as the communication circuit 18 between node A and node C. In accordance with an embodiment of the present invention, such a matrix is displayed on the screen of a terminal 14 and the user is thus provided with a visual representation of the possible channels that can be controlled between a particular pair of nodes. The user can select specific channels to be controlled by reference to the displayed matrix, such as by utilizing a pointing device such as a mouse, to point to a particular cell and click to select or de-select a corresponding channel to be controlled. The illustrated "X's" illustrate that a user has selected in TG1, channels CH1, CH2, and in TG(N), channels CH2 and CH(N). Thus, the user is provided a visual interface for selecting communication channels to be controlled by the generation of appropriate command messages. The computer system 10 controls the display of the control matrix and receives the user's selection of channels to be controlled.

FIG. 3 provides a visual depiction of a rules database 40 which is preferably stored in computer system 10. This database contains a data format definition for each of the rules which controls the formatting of permitted types of command messages. Thus, for each of the rules, as indicated in the left-hand column, a corresponding format definition exists in the right column. It will be understood by those skilled in the art that the particular rules illustrated are only exemplary of the various possible rules which may be employed depending on the design of the system.

To facilitate an understanding of the types of rules which are typically utilized, visual depictions of the rule parameters are shown in FIGS. 4-8 which correspond to the illustrated rules 1, 2, 3, N−1, and N, respectively. For example, rule 1 defines that a single cell, i.e. a 1×1 in matrix 38, can be controlled by the sending of a single corresponding command message. Rule 2 defines that a 1×2 cell selection pattern, i.e. two cells in two different columns contained in a single row, are controllable by the sending of a single command message. Rule 3 defines a "A×2" configuration, i.e. all (A) cells in a first and second column can be controlled by a single command message. The illustrated rules 1, 2, and 3 define an inclusive definition of possible pattern combinations allowed as single command messages.

Figure 8:
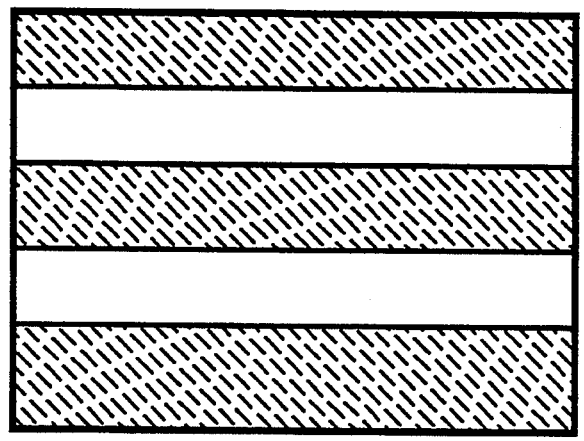

Rules N−1 and N are illustrative of another type of rule which is exclusive, i.e. defines a set of cells in matrix 38 which are to be excluded or not controlled (not changed) by a command message. The role N−1 defines the pattern represented by FIG. 7 of "NOT (2×1)". This pattern is interpreted as including all cells for control except two cells lying in one column and two different rows. The illustrated rule N which is defined as "NOT (2×A)" is represented in FIG. 8. This pattern represents the inclusion for control of all cells except those contained in two rows of matrix 38.

The rules database 40 thus defines the types of command messages which can be generated to identify corresponding sets of communication channels between a specified pair of nodes in network 12. This provides users with the opportunity to activate or de-activate sets of communication channels in order to control the flow of traffic in the network.

Figure 5:
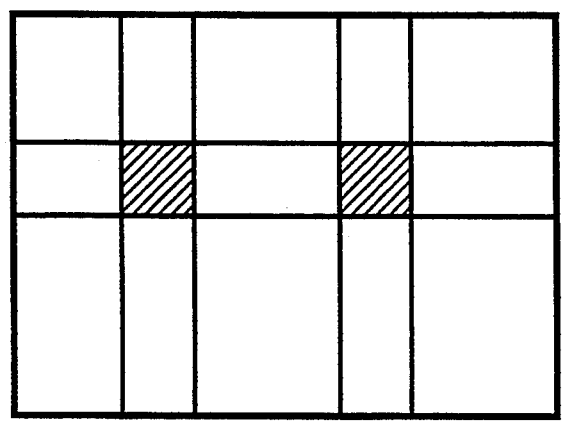
Figure 6:
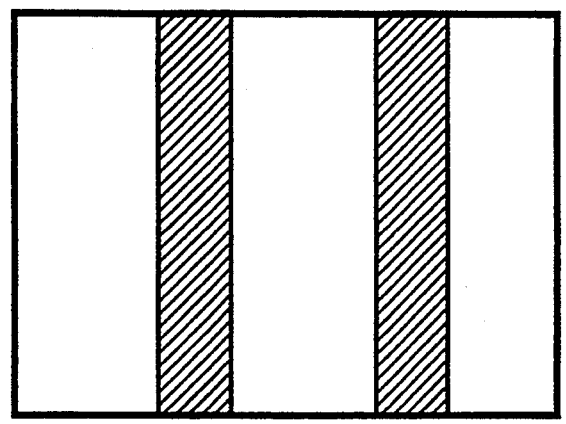
Figure 7:
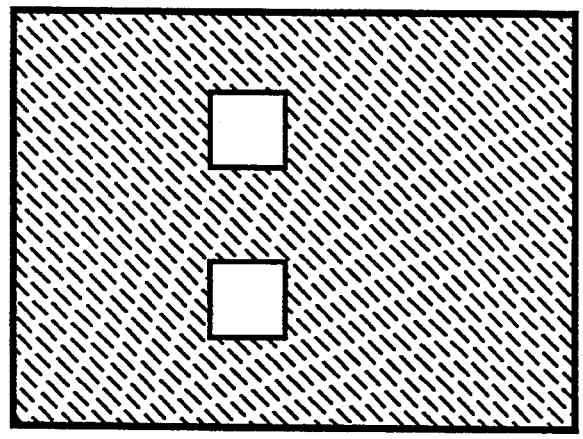
FIGS. 7 and 8 illustrate a visual representation of the exclusionary matrix patterns represented by rules (N−1) and N, respectively, of FIG. 3.

It will be apparent to those skilled in the art that additional user input defining the specific cells which meets a rule definition is also required. The specific cells are identified and sent as an argument with the corresponding command message in order to effectuate network control. For example, with respect to rule 2 as illustrated in FIG. 5, a command message of the type corresponding to rule 2 would be utilized in combination with an X axis coordinate of the matrix to define the transmission group and two Y axis coordinates to define the specific channels associated with that transmission group. Thus, the format of the rule combined with the specific definition of cells provided as arguments comprises a complete message which can be transmitted to a node in network 12 to cause the corresponding channels to be identified for a change in status. The particular change in status of the selected channels can either be concatenated or combined with such a command message, sent as a separate message defining action to be taken with the previously defined channels, or may be implicit to a node A such as indicating a change of state such as from active to inactive communication status.

Computer system 10 operates under the control of program instructions and assists the user in selecting a set of command messages to be transmitted to a node in network 12 to implement desired changes. The user initiates the process by identifying the node associated with the channels to be controlled. For example, to control channels carrying traffic from node A to node C, the user would select node A as the target node to send command messages. The computer system 10 causes the user's screen to display a matrix 38 allowing the user to make visually based entries defining cells which correspond to specific channels to be controlled. Upon finishing the selection, the user requests the computer system 10 to generate an appropriate set of command messages to implement the desired changes such as by hitting a predefined key or using the mouse to click on an appropriate "GO" icon displayed on the screen. The computer system compares the entered cells to the possible command message formats corresponding to the rules contained in database 40. Preferably, each of the possible command messages which could be validly generated based on the selected cells is identified and placed on a first list. The rule contained in the first list that controls the largest number of cells is selected for entry on a second list. Following this selection, the corresponding rule on the first list is eliminated as are other rules contained on the first list which require cells included by the rule entered on the second list. This process continues until all user selected cells have been accounted for by a rule entered in list two. In this manner, rules are entered on the second list based on the number of corresponding channels to be controlled. At the conclusion of this process, list two will contain a listing of rules, and hence corresponding command messages, for all selected channels to be reconfigured at node A. The cells associated with each selected rule of the second list are identified such as by associated arguments. The command messages are then transmitted to node A to reconfigure the selected channels.

It will be apparent to those skilled in the art that this method eliminates potential errors that could be made by the user upon the manual selection of command messages corresponding to sets of rules. Thus, the illustrative embodiment of the present invention facilitates the ease of reconfiguring and controlling communication channels in network 12.

The following Table 1 illustrates an example of a method in accordance with an embodiment of the present invention which utilizes the capabilities of computer system 10.

Table 1

(1) A traffic administrator (TA) selects an internode path to be controlled. For example, TA elects to control the paths from Node A and Node B.

(2) The TA selects the traffic groups (TG's) and channel (CH's) between Node A and B to be controlled from a terminal such as by pointing and clicking with a mouse on cells of the Control Matrix (FIG. 2) displayed on the terminal's screen.

(3) The TA then indicates the selection process has been completed and that the automatic command message generation process should begin such as by pointing and clicking on a "GO" icon displayed on the terminal's screen.

(4) The computer system then applies the grouping rules to the TG's and CH's selected on the Control Matrix to find all possible combinations that are allowed.

(5) Allowable combinations of cells are stored in a first listing by command message types along with the number of cells associated with the command message.

(6) From the first listing, one allowable command type with the largest number of associated cells is selected. If more than one combination has the same number of associated cells, then one of this set is selected.

(7) The command type selected from the first listing is stored in second listing.

(8) The first listing is updated by deleting any previously allowable combinations (command message types) that are no longer allowable after cells associated with the command message in the second listing are removed from consideration. For example, patterns in the first listing that overlap a pattern selected in the second listing are no longer valid and should be deleted from the first listing.

(9) If any patterns remain in the first listing, return to step 6 to make another selection for the second listing. This continues until no patterns remain in the first listing; this indicates that all TA cell selections have been assigned to a pattern in the second listing. Proceed to step 10 if no patterns remain in the first listing.

(10) Transmit the set of command messages along with arguments identifying specific cells stored in the second listing to the node to be controlled, i.e. in this example Node A.

(11) End of illustrative process.

Although the above illustrative example in accordance with the present invention is directed to the control of communication channels in network 12, it will be apparent that the automatic generation of command messages can be utilized to control other configurable parameters associated with the nodes or with traffic signals carried by the nodes. For example, messages sent between nodes may have a service identity (SI) such as long distance calls, "800" calls, POTS calls, etc. These messages may also require an identified transport capability (TC) such as voice, data, etc. A routing pattern (RP) consists of a set of combinations of one SI and one TC. Command messages in accordance with this invention can be generated to control these parameters.

Although an embodiment of the present invention has been described and illustrated in the drawings, the scope of the invention is defined by the claims which follow.

We claim:

1. In a telecommunication network having communication nodes interconnected with each other by a plurality of communication channels, a computer implemented method for selecting command messages to control corresponding communication channels, the method comprising the steps of:
   a) storing in memory a group of rules, each rule defining an allowable combination of communication channels that are controllable by a command message;
   b) receiving and storing inputs from a user defining ones of the communication channels to be controlled;
   c) receiving an input from the user indicating that all of said ones of the communication channels have been defined;

d) comparing, in response to receipt of said input of step c), said ones of the communication channels to said rules to determine sets of communication channels that are allowable;

e) generating and storing a first list of said sets of communication channels;

f) choosing one of said sets of communication channels from the first list and entering said one of said sets of communication channels on a second list stored in memory;

g) excluding those of said sets of communication channels listed on said first list having a communication channel associated with one of said sets of communication channels stored on the second list;

h) repeating steps f) and g) until all of the ones of the communication channels entered by the user are contained in a set of communication channels on said second list, each of said sets of the communication channels stored on the second list having a corresponding command message, so that a group of command messages associated with the second list is automatically determined and used in controlling said communication channels.

2. The method according to claim 1 wherein said choosing step comprises the step of choosing one of said sets of communication channels from the first list having the largest number of associated communication channels.

3. The method according to claim 1 wherein steps a) through h) are carded out on a computer system that is located apart from the communication nodes.

4. The method according to claim 3 further comprising the step of transmitting said group of command messages to a node in the telecommunication network coupled to the communication channels to be controlled.

5. The method according to claim 1 further comprising the step of transmitting said group of command messages to a node in the telecommunication network coupled to the communication channels to be controlled.

6. The method according to claim 1 wherein each of said rules defines an allowable combination of communication channels that are controllable by a single type of command message.

7. In a communication network having communication nodes with configurable parameters, a computer implemented method for selecting command messages to control said configurable parameters, the method comprising the steps of:

a) storing in memory a group of rules, each rule defining an allowable combination of configurable parameters that are controllable by a command message;

b) receiving and storing inputs from a user defining ones of the configurable parameters to be controlled;

c) receiving an input from the user indicating that all of said ones of the configurable parameters have been defined;

d) comparing, in response to receipt of said input of step c), said ones of the configurable parameters to said rules to determine sets of configurable parameters that are allowable;

e) generating and storing a first list of said sets of configurable parameters;

f) choosing one of said sets of configurable parameters from the first list and entering said one of said sets of configurable parameters on a second list stored in memory;

g) excluding those of said sets of configurable parameters listed on said first list having a controllable parameter associated with one of said sets of configurable parameters stored on the second list;

h) repeating steps f) and g) until all of the ones of the configurable parameters entered by the user are contained in a set of configurable parameters on said second list, each of said sets of the configurable parameters stored on the second list having a corresponding command message so that the command messages associated with the second list define a group of command messages to be used in controlling said configurable parameters.

8. The method according to claim 7 wherein said choosing step comprises the step of choosing one of said sets of configurable parameters from the first list having the largest number of associated configurable parameters.

9. The method according to claim 7 wherein steps a) through h) are carried out on a computer system that is located apart from the communication nodes.

10. The method according to claim 9 further comprising the step of transmitting said group of command messages to a node in the communication network coupled to the configurable parameters to be controlled.

11. The method according to claim 7 further comprising the step of transmitting said group of command messages to a node in the communication network coupled to the configurable parameters to be controlled.

12. The method according to claim 7 wherein each of said rules defines an allowable combination of configurable parameters that are controllable by a single type of command message.

13. In a telecommunication network having communication nodes interconnected with each other by communication channels, a computer implemented method for sending commands to the nodes in the network in order to effectuate changes in the handling of traffic in the network, the method comprising the steps of:

a) storing in memory a group of rules, each rule defining a command message that controls a combination of parameters associated with at least one node;

b) receiving and storing inputs from a user defining parameters to be controlled;

c) determining sets of allowable commands by comparing said input parameters to said rules;

d) storing a first list of said determined sets of allowable commands;

e) generating a second list of said sets based on said first list of sets, upon selecting a set listed in said first list for inclusion in the second list, excluding from the first list those of said sets in the first list which have at least one parameter in common with any of the sets in the second list;

f) transmitting said command messages defined by said second list to the nodes in order to effectuate changes in the handling of traffic in the network.

14. The method according to claim 13 wherein said generating step comprises the step of sequentially selecting sets for inclusion in the second list from the first list by selecting the sets in the first list having the largest number of associated parameters.

* * * * *